United States Patent
Constantine et al.

(10) Patent No.: US 8,821,223 B2
(45) Date of Patent: Sep. 2, 2014

(54) FISH FILET GRIPPER TOOL

(71) Applicants: Richard S. Constantine, Milford, CT (US); Man For Ma, New Territories (HK)

(72) Inventors: Richard S. Constantine, Milford, CT (US); Man For Ma, New Territories (HK)

(73) Assignee: Acme United Corporation, Fairfield, CT (US)

( * ) Notice: Subject to any disclaimer, the term of this patent is extended or adjusted under 35 U.S.C. 154(b) by 0 days.

(21) Appl. No.: 13/737,178

(22) Filed: Jan. 9, 2013

(65) Prior Publication Data

US 2014/0194043 A1     Jul. 10, 2014

(51) Int. Cl.
*A22B 5/16*    (2006.01)
*A22C 25/17*   (2006.01)

(52) U.S. Cl.
CPC .................................. *A22C 25/17* (2013.01)
USPC ...................................................... 452/125

(58) Field of Classification Search
USPC ........... 119/600, 625, 630–632; 452/102–105
See application file for complete search history.

(56) References Cited

U.S. PATENT DOCUMENTS

| | | | | | |
|---|---|---|---|---|---|
| 1,172,658 | A | * | 2/1916 | Edgar | 379/445 |
| 2,109,859 | A | * | 3/1938 | Cope | 452/103 |
| 2,179,758 | A | * | 11/1939 | Schlueter | 452/105 |
| 2,405,760 | A | * | 8/1946 | Shaks | 294/100 |
| 2,800,879 | A | * | 7/1957 | Quick | 119/631 |
| 3,107,665 | A | * | 10/1963 | Nordgren | 601/134 |
| 3,955,234 | A | * | 5/1976 | Roefaro | 15/236.06 |
| 4,028,825 | A | * | 6/1977 | Tetzner | 43/53.5 |
| 4,046,109 | A | * | 9/1977 | Miller et al. | 119/631 |
| 4,397,087 | A | * | 8/1983 | Burrage | 30/120.3 |
| 5,230,652 | A | * | 7/1993 | Alam | 452/98 |
| 5,626,099 | A | * | 5/1997 | Staller et al. | 119/625 |
| 5,655,482 | A | * | 8/1997 | Lundquist | 119/625 |
| 6,367,422 | B1 | * | 4/2002 | Wilhelmi | 119/625 |
| 7,862,408 | B1 | * | 1/2011 | Weinstein | 452/146 |
| 8,172,651 | B1 | * | 5/2012 | Trahan et al. | 452/105 |

* cited by examiner

Primary Examiner — Richard Price, Jr.
(74) *Attorney, Agent, or Firm* — Alix, Yale & Ristas, LLP

(57) ABSTRACT

A gripper tool is employed for clamping the fish filet to facilitate the removal of skin from the filet. The gripper tool has a handle which is adapted to be gripped by the user and a gripping surface defined by a matrix of protrusions which clamp against the fish filet.

20 Claims, 5 Drawing Sheets

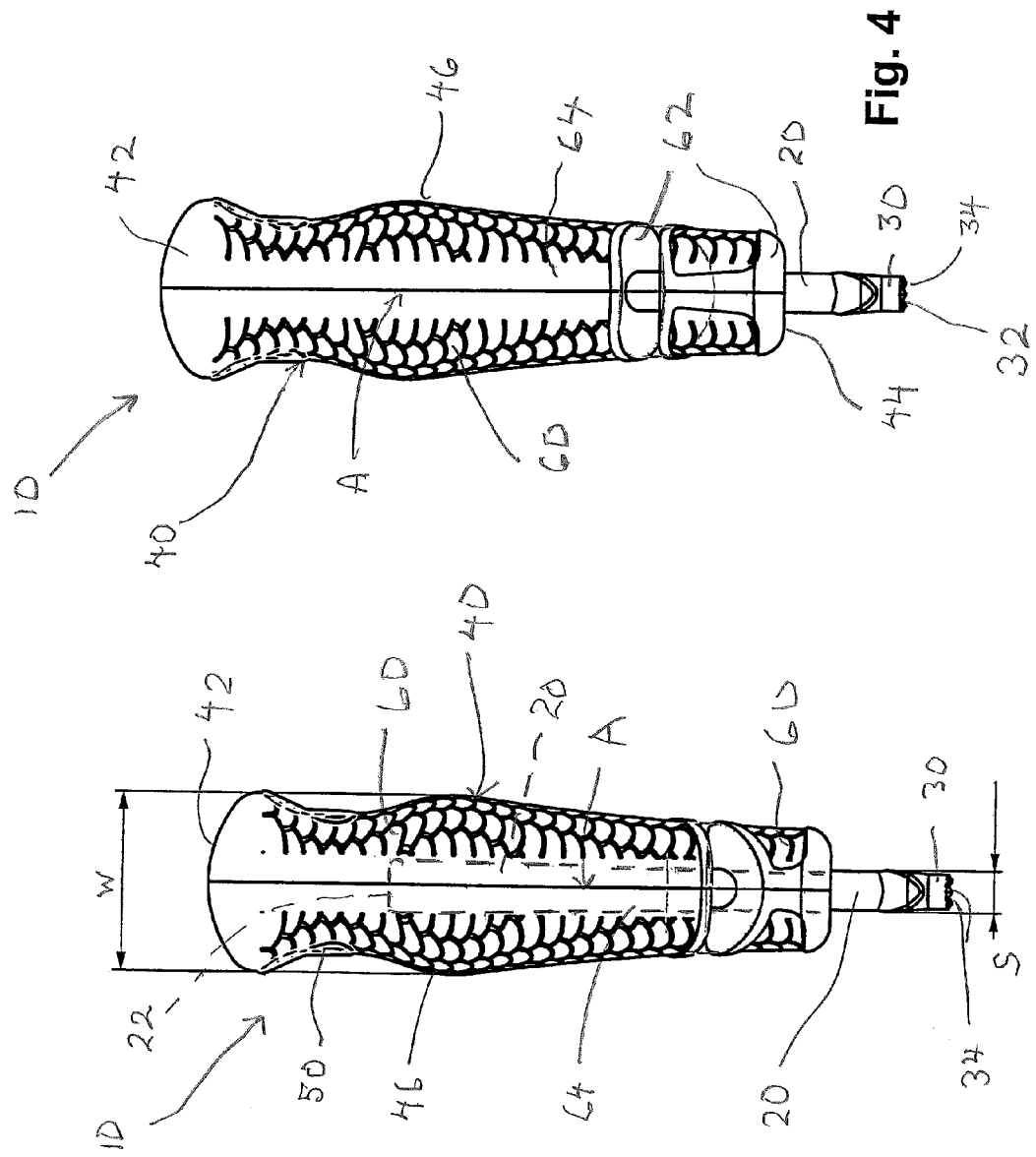

FISH FILET GRIPPER TOOL

BACKGROUND

This disclosure relates generally to tools and techniques employed for filleting fish. More particularly, this disclosure relates to tools and techniques for removing the skin from the fish filet.

A fish is typically filleted by a fish knife which is employed to separate a filet from a fish carcass. Once the filet is separated, a final step is to remove the skin. In conventional techniques a small edge of the filet is cut. The filet knife then is used to sever between the fish skin and the remaining filet to produce a skinless filet.

The fish is typically slippery and it is difficult to hold onto the fish filet during the skin removing process. The fish filleting process is typically accomplished under less than ideal conditions and not uncommonly is undertaken in an outdoor environment in which implements, knives and other equipment are minimal.

SUMMARY

Briefly stated, a gripper tool for a fish filet comprises a shaft having a longitudinal axis. A handle is mounted to the shaft. A gripper head is connected to the shaft at one end and extends generally orthogonally to the longitudinal axis. The opposed end of the gripper head has a gripping surface. The gripping surface is defined by a matrix of protrusions. Each of the protrusions has an apex. The apices collectively form a generally coplanar apex array.

The protrusions have a diamond pyramid-like shape. The protrusions are substantially identical. The handle extends from a proximal end to a terminal end spaced from the gripper head. The handle is defined by an overmold symmetric to a central plane through the longitudinal axis. The overmold surrounding the shaft and surrounds at least a portion of the shaft. The gripper tool handle has a knob at the proximal end. The handle has a reverse tapered hand grip portion between the proximal end and the terminal end.

The shaft and the gripper head, including the gripping surface, are preferably formed from metal. The overmold is partially covered by a covering material traversed by a multiplicity of adjacent fish skin-like shapes. The handle has a transverse through-opening intersecting the longitudinal axis. The handle opening is preferably elongated and defines a slot axis oblique to the longitudinal axis.

In one embodiment, the overmold is formed from clear ABS material. The covering material forms a circumferential, longitudinally extending, interrupted portion as well as other interrupted surface areas. The interrupted portion is preferably transparent. One part of the interrupted portion is each oriented obliquely with respect to the longitudinal axis.

BRIEF DESCRIPTION OF THE DRAWINGS

FIG. 3 is a left side elevational view, partly in diagram form and partly in phantom, of the fish filet gripper tool of FIG. 2;

FIG. 4 is a right side elevational view, partly in diagram form, of the fish filet gripper tool of FIG. 2;

DETAILED DESCRIPTION

Figure 1:
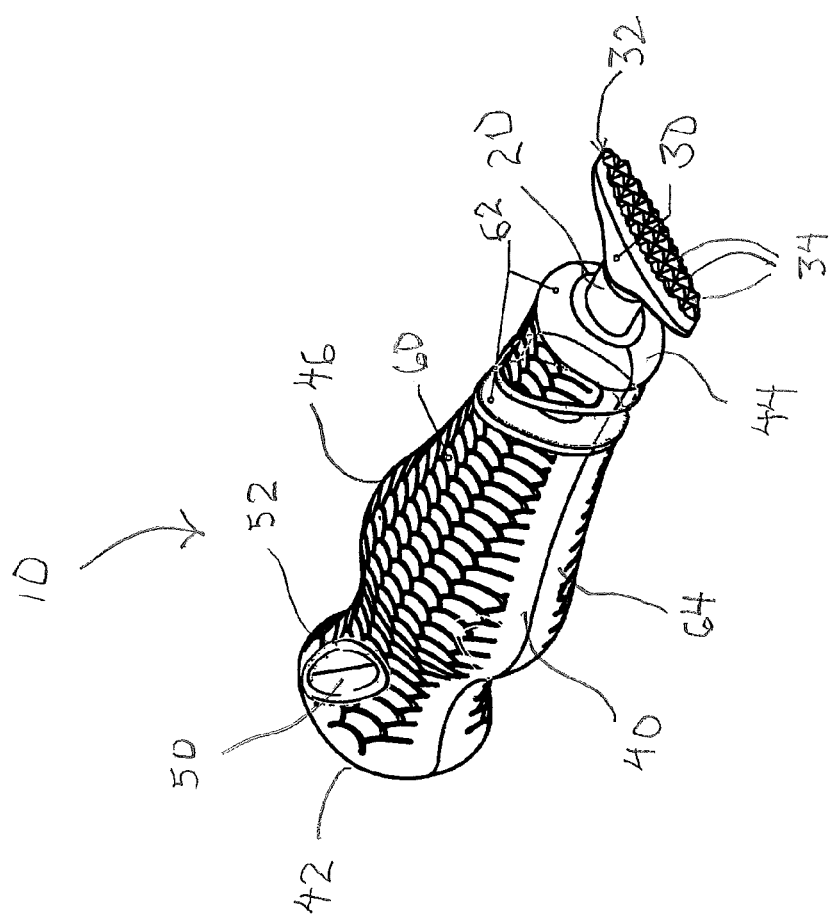
FIG. 1 is a perspective view of a fish filet gripper tool.

With reference to the drawings wherein like numerals represent like parts throughout the several Figures, a fish filet gripper tool is generally designated by the numeral 10. Gripper tool 10 is especially adapted for gripping a fish filet in a fashion which allows the user to grip the filet and hold the filet against a surface at the same time a filet knife is employed to sever the skin from the rest of the filet. The fish filet gripper tool 10 is adapted for heavy duty usage and is easily cleaned and maintained along with the filet knife and other implements employed in filleting.

The gripper tool 10 includes a metal shaft 20 of elongated form. The shaft has a central longitudinal axis A. A gripper head 30 integrally connects with the shaft and extends transversely relative to the shaft. The gripper head 30 preferably forms a generally oval, quasi-elliptical or tapered profile which is symmetric about a pair of perpendicular planes. The shaft has a proximal end 22 and a tapered terminal end 24 which connects with the gripper head 30.

Figure 5:
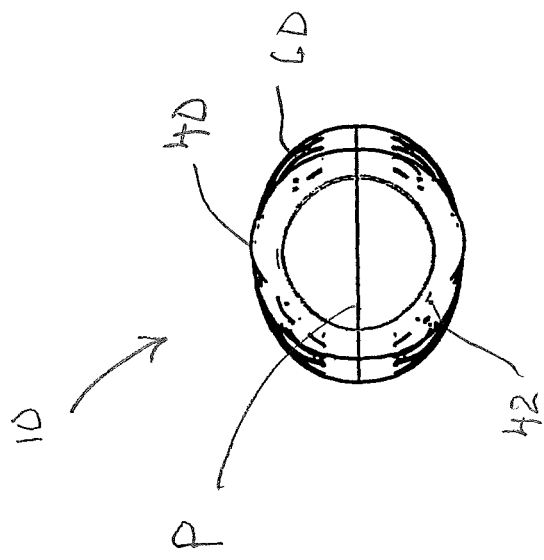
FIG. 5 is a top plan view, partly in diagram form, of the fish filet gripper tool of FIG. 2.

An overmold 40 surrounds a substantial portion of the shaft 20 and covers the shaft from the proximal end to a rounded end 44 slightly spaced from the terminal end 24. In a preferred form, the overmold 40 has a general exterior profile symmetric about perpendicular planes thru axis A (one plane P is designed in FIG. 5). The overmold 40 exteriorly forms a contoured knob 42 surrounding the proximal end and a dual or reversed tapered grip portion 46 integrally extending from the knob to a portion slightly spaced from the gripper head. The grip portion 46 has a contoured medial bulge. The overmold 40 functions as a handle which is adapted to be gripped by the user. The knob 42 can be employed to provide a downward axial force against the gripper head 30. In one embodiment, the overmold 40 is formed from a clear ABS material. Other materials are possible.

An elongated opening or through slot 50 is formed in the overmold to facilitate attaching the gripper tool to a fish line, hanging the gripper tool or otherwise retaining same in a fixed position or to other objects. The slot 50 is disposed at an oblique angle to axis A in the illustrated embodiment. The overmold includes a contoured depression or concavity 52 which tapers to the opening on both the front and rear portions of the overmold.

A decorative covering 60 partially covers overmold 40. Covering 60, in one embodiment, is a thin, relatively soft overmold of TPR material. Covering 60 preferably has a pattern which resembles a fish's skin. The covering 60 only partially covers overmold 40 so that it is interrupted with transparent or translucent portions at circumferential and end portions 62 and at side portions 64 to reveal shaft 20. The covering 60 also facilitates gripping of the tool.

Figure 6:
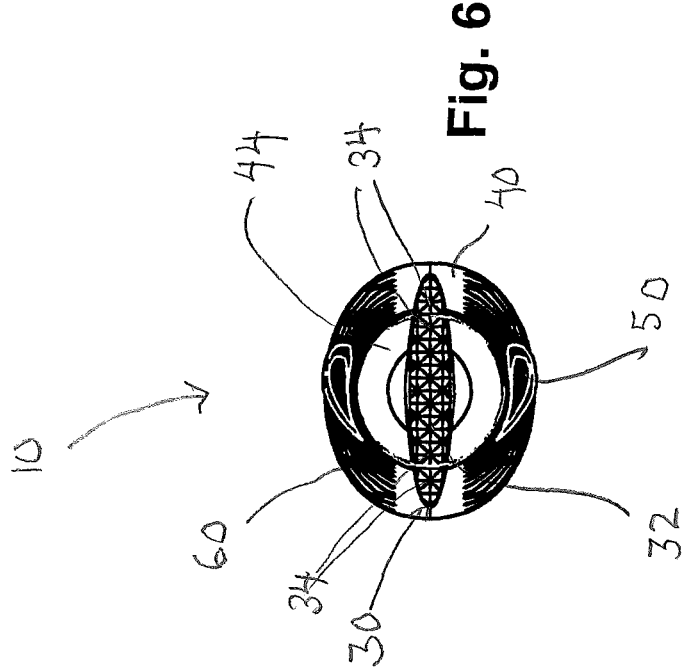
FIG. 6 is a bottom plan view of the fish filet gripper tool of FIG. 2.
Figure 7:
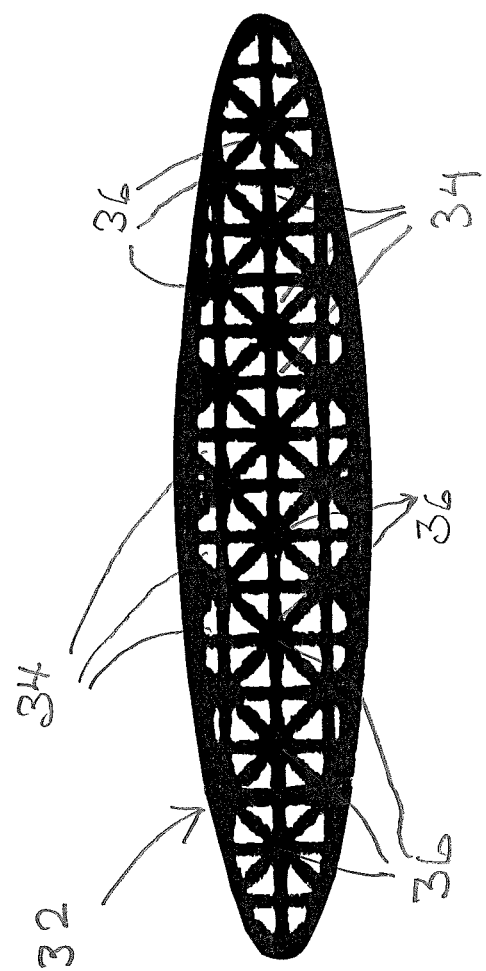
FIG. 7 is an enlarged fragmentary bottom plan view of the fish filet gripper tool of FIG. 2.

With reference to FIGS. 6 and 7, the gripper head 30 has a gripping surface 32 which is preferably formed by a matrix of adjacent diamond pyramid shaped protrusions 34. In one form, the protrusions are substantially identically shaped and dimensioned. Each of the protrusions functions as a spike-like surface which engages against the flesh of the fish filet in a multi-point, semi-penetrating manner. The spike-like gripping surface 32 functions to prevent the filet from moving even when a transverse force is applied by the knife across the surface of the filet. The protrusions 34 each have an apex 36, and in one preferred form, each of the apices form a substantially co-planar series of points.

Figure 2:
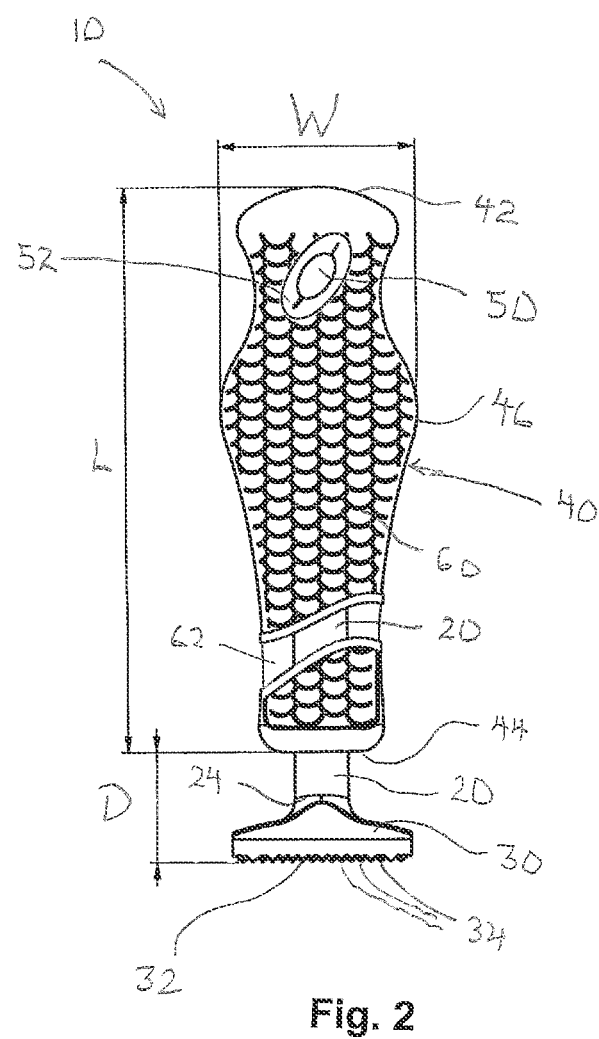
FIG. 2 is a front elevational view, partly in diagram form, of the fish filet gripper tool of FIG. 1.

With reference to FIGS. 2 and 3, in one preferred embodiment, the handle has an axial length L of approximately 125.5 millimeters, and the axial distance D from the lower end of the handle to the lower end of the gripping surface is approximately 24.5 millimeters. The maximum width of the gripping surface is approximately 40 millimeters. The major width W of the handle is approximately 43.9 millimeters and the minor width w is approximately 36.0 millimeters. The width s of the shaft 20 which leads to the gripper head 30 is approximately 8.4 millimeters. The overmold preferably 40 is also traversed by a medial portion which has a smooth contour from the front and rear and is formed from clear ABS plastic material. The metal shaft 20 and gripper head 30 are preferably manufactured from cast aluminum.

It will be appreciated that the gripping surface 32 may be dimensioned in various sizes so that the gripper tool is adaptable for a wide variety of fish sizes. The narrow width of the gripping surface 32 allows the effective gripping surface to be applied against a relatively small portion of the fish at the edge where a small portion of the skin is either absent or initially removed.

In practice, the gripper tool 10 may be effectively and efficiently employed when it is desired to remove the skin from a fish filet. If required, a small portion of the skin is removed along the edge of the filet. The gripper tool is then clamped in one hand and forced against the skinless edge of the filet by the person doing the filleting. A filet knife (not illustrated) is placed adjacent the gripper tool 10, and the blade is oriented between the skin and the remaining portion of the filet. A lateral force applied to the filet knife blade across the filet while the clamp force is exerted by the gripper tool 10 allows the skin to be removed without significant (or any movement) of the remainder of the filet.

While preferred embodiments of the foregoing invention have been set forth for purposes of illustration, the foregoing description should not be deemed a limitation of the invention herein. Accordingly, various modification, adaptations and alternatives may occur to one skilled in the art without departing from the spirit and the scope of the present invention.

What is claimed:

1. A gripper tool for a fish filet comprising:
   a shaft defining a longitudinal axis;
   a handle mounted to said shaft;
   a gripper head connected to said shaft at one end and extending generally orthogonally to said longitudinal axis and at an opposed end having a gripping surface; and
   said gripping surface defined by a matrix of axial protrusions extending generally parallel to said longitudinal axis, each protrusion having an apex and defining an apex array which is generally co-planar and generally orthogonal to said longitudinal axis.

2. The gripper tool of claim 1 wherein said protrusions have a diamond pyramid-like shape.

3. The gripper tool of claim 2 wherein said protrusions are substantially identical.

4. The gripper tool of claim 1 wherein said handle extends from a proximal end to a terminal end spaced from said gripper head.

5. The gripper tool of claim 4 wherein said handle is defined by an overmold symmetric to a central plane through said longitudinal axis.

6. The gripper tool of claim 5 wherein said handle has a knob at said proximal end.

7. The gripper tool of claim 5 wherein said handle has a reversed tapered hand-grip portion between said proximal end and said terminal end.

8. The gripper tool of claim 1 wherein said handle is formed from an overmold surrounding at least a portion of said shaft and is symmetric to a central plane through said longitudinal axis.

9. The gripper tool of claim 8 wherein said overmold is covered by a covering having a pattern of a multiplicity of adjacent fish skin-like shapes.

10. The gripper tool of claim 9 wherein said covering forms a circumferential, longitudinally extending interrupted portion.

11. The gripper tool of claim 10 wherein said interrupted portion is transparent or translucent.

12. The gripper tool of claim 8 wherein said overmold is formed of clear ABS material.

13. The gripper tool of claim 1 wherein said shaft and said gripper head, including said gripping surface, are formed from metal.

14. The gripper tool of claim 1 wherein said handle has a through opening intersecting said longitudinal axis.

15. The gripper tool of claim 14 wherein said opening is elongated and defines a slot axis oblique to said longitudinal axis.

16. A gripper tool for a fish filet comprising:
    a shaft defining a longitudinal axis;
    a handle mounted to said shaft comprising a contoured overmold defining an opening;
    a gripper head connected to said shaft at one end and extending generally orthogonally to said longitudinal axis and at an opposed end having a gripping surface; and
    said gripping surface defined by a matrix of axial protrusions which project generally parallel to said longitudinal axis.

17. The gripper tool of claim 16 wherein said protrusions have a diamond pyramid-like shape with an apex and forms a substantially co-planar apex array.

18. The gripper tool of claim 16 wherein said overmold surrounds at least a portion of said shaft and is symmetric to a central plane through said longitudinal axis.

19. The gripper tool of claim 18 wherein said gripper has an elongated tapered profile.

20. The gripper tool of claim 16 further comprising a covering which covers portions of said overmold and forms interrupted exterior surface areas.

* * * * *